US009919716B2

(12) United States Patent
Christensen et al.

(10) Patent No.: US 9,919,716 B2
(45) Date of Patent: Mar. 20, 2018

(54) ARRANGEMENT AND METHOD FOR FACILITATING HANDOVER TO AND FROM AN AUTOMATED AUTONOMOUS DRIVING AID SYSTEM

(71) Applicant: VOLVO CAR CORPORATION, Gothenburg (SE)

(72) Inventors: Claus Allan Christensen, Copenhagen (DK); Christian Hedegaard, Copenhagen (DK); Erik Israelsson, Gothenburg (SE); Thomas Bove, Copenhagen (DK)

(73) Assignee: Volvo Car Corporation, Gothenburg (SE)

( * ) Notice: Subject to any disclaimer, the term of this patent is extended or adjusted under 35 U.S.C. 154(b) by 22 days.

(21) Appl. No.: 15/172,341

(22) Filed: Jun. 3, 2016

(65) Prior Publication Data
US 2016/0375912 A1 Dec. 29, 2016

(30) Foreign Application Priority Data
Jun. 23, 2015 (EP) ..................................... 15173383

(51) Int. Cl.
*B60W 50/08* (2012.01)
*B60W 50/00* (2006.01)
(Continued)

(52) U.S. Cl.
CPC ............ *B60W 50/082* (2013.01); *B60Q 9/00* (2013.01); *B60W 30/12* (2013.01);
(Continued)

(58) Field of Classification Search
CPC ........... B60W 50/0097; B60W 50/082; B60W 30/12; B60W 30/143; B60W 2050/0077;
(Continued)

(56) References Cited

U.S. PATENT DOCUMENTS

2016/0093211 A1\* 3/2016 Giesler ................ B60W 50/14
701/23

FOREIGN PATENT DOCUMENTS

| DE | 102010053964 | 8/2011 |
| DE | 102011002911 | 7/2012 |
| DE | 102013008605 | 11/2014 |

OTHER PUBLICATIONS

Extended European Search Report for European Application No. EP 15173383.9, Completed by the European Patent Office, dated Dec. 22, 2015, 7 pages.

\* cited by examiner

*Primary Examiner* — Yuen H Hong
(74) *Attorney, Agent, or Firm* — Brooks Kushman P.C.

(57) ABSTRACT

An arrangement for facilitating handover to and from an automated autonomous driving aid system of a vehicle comprises a lane marking detecting unit, a steering control driving aid system for performing steering in response to detected lane markings, a positioning system for determining a current position and a current heading direction, an alert signal arrangement for selectively providing an alert signal, and a communication arrangement for communicating with a database comprising data indicative of an incapability of performing automated steering at a portion of a road ahead. The communication arrangement is configured to receive the data from the database and configured to provide an alert signal in case the data indicates an incapability of performing an automated steering at an upcoming road portion.

14 Claims, 2 Drawing Sheets

(51) Int. Cl.
    *B62D 15/02*     (2006.01)
    *B60W 30/12*     (2006.01)
    *B60W 30/14*     (2006.01)
    *G01C 21/36*     (2006.01)
    *G06K 9/00*      (2006.01)
    *B60Q 9/00*      (2006.01)
    *G01C 21/34*     (2006.01)
    *G01S 19/42*     (2010.01)
    *G05D 1/00*      (2006.01)
    *G06T 7/20*      (2017.01)
    *G06T 7/70*      (2017.01)
    *B60W 50/14*     (2012.01)

(52) U.S. Cl.
    CPC ...... *B60W 30/143* (2013.01); *B60W 50/0097* (2013.01); *B62D 15/025* (2013.01); *G01C 21/34* (2013.01); *G01C 21/3697* (2013.01); *G01S 19/42* (2013.01); *G05D 1/0088* (2013.01); *G06K 9/00335* (2013.01); *G06K 9/00798* (2013.01); *G06T 7/20* (2013.01); *G06T 7/70* (2017.01); *B60W 2050/0077* (2013.01); *B60W 2050/143* (2013.01); *B60W 2550/402* (2013.01); *G06T 2207/30256* (2013.01)

(58) Field of Classification Search
    CPC ...... B60W 2050/143; B60W 2550/402; G06K 9/00335; G06K 9/00798; G05D 1/0088; G01S 19/42; B60Q 9/00; G06T 7/20; G06T 7/70; G06T 2207/30256; G01C 21/34; G01C 21/3697; B62D 15/025
    See application file for complete search history.

ARRANGEMENT AND METHOD FOR FACILITATING HANDOVER TO AND FROM AN AUTOMATED AUTONOMOUS DRIVING AID SYSTEM

CROSS-REFERENCE TO RELATED APPLICATIONS

This application claims foreign priority benefits under 35 U.S.C. § 119(a)-(d) to European patent application number EP15173383.9, filed Jun. 23, 2015, which is incorporated by reference in its entirety.

TECHNICAL FIELD

The present disclosure relates to an arrangement and a method for facilitating handover to and from an automated autonomous driving aid system of a vehicle hosting the arrangement. The present disclosure also relates to a database.

BACKGROUND

Automated autonomous driving aid systems of road vehicles have become increasingly present in today's vehicles. Various arrangements and methods have been developed to assist driver of a road vehicle and relieve the driver for at least some of the driving tasks.

Automated vehicles often obtain their semi-autonomous driving capabilities based on camera and radar sensors. Performances of such automated vehicles are dependent on a camera to detect lane marking on the road to enable automated active steering and radar is used to detect and measure distance to a lead vehicle for automated throttle control. If no lead vehicle is present the automated vehicle will lose its self-driving capabilities as soon as lane markings are not detected, e.g. being missing, worn out or covered by snow etc.

As a result, for road vehicles having semi-autonomous driving capabilities the driving experience becomes unpredictable. As the transitioning time from semi-autonomous to manual modes of driving is very short, often less than 1 second, a driver of the vehicle may be required to continuously monitor the system closely at all times, almost requiring the same mental effort from the driver as when driving manually, in order to be able to take over the task of driving if required.

In view of the above, there is a need for improving the predictability of transition requirements, to and from automated autonomous driving aid control systems.

SUMMARY

An object of the present disclosure is to provide an improved arrangement and method for facilitating handover from an automated autonomous driving aid system of a vehicle hosting the arrangement.

According to an embodiment of the disclosure, there is provided an arrangement configured to facilitate handover to and from an automated autonomous driving aid system of a vehicle hosting the arrangement, the arrangement comprising a lane marking detecting unit configured to detect lane markings in an environment surrounding the vehicle, a steering control driving aid system having an activated state in which the steering control driving aid system is configured to perform an automated steering of the vehicle by controlling steering of the vehicle in response to the detected lane markings, and an deactivated state in which no automated steering is performed, a positioning system configured to determine a current position of the vehicle and a current heading direction of the vehicle, an alert signal arrangement configured to selectively provide an alert signal in a driver environment of the vehicle, and a communication arrangement arranged to communicate with a database, wherein the database comprises data indicative of an incapability of performing automated steering of the vehicle at a portion of a road preceding the vehicle, where the communication arrangement is configured upload, to the database, at least one of the current position together with the current heading direction of the vehicle, and a planned route of the vehicle, and in response thereto, receive the data from the database, where the arrangement is configured to provide an alert signal, via the alert signal arrangement, in case the data indicates an incapability of performing an automated steering of the vehicle at an upcoming portion of the road.

Since the database comprises data indicative of an incapability of performing automated steering of the vehicle at a portion of a road preceding the vehicle and where the arrangement is configured to provide an alert signal, via the alert signal arrangement, in case the data indicates an incapability of performing an automated steering of the vehicle at an upcoming portion of the road, the alert signal will be provided in case the data indicates an incapability of performing an automated steering of the vehicle at an upcoming portion of the road. As a result, a more trustful and predictable driving experience is provided whereby the predictability of transition requirements, from the automated autonomous driving aid control system is increased. Further, since the arrangement is configured to provide an alert signal, via the alert signal arrangement, in case the data indicates an incapability of performing an automated steering of the vehicle at an upcoming portion of the road, a driver of the vehicle hosting the arrangement is alerted of the incapability of performing an automated steering of the vehicle at an upcoming portion of the road. As a result, the driver may take over control of the vehicle prior to arrival to the upcoming portion. The driver will thus also have more time available for such a takeover of control of steering of the vehicle. Accordingly, handover from the automated autonomous driving aid system is facilitated.

As a further result, safety of driving is improved since the driver will have more time available for a takeover of control of steering of the vehicle and since the driver may take over control of the vehicle prior to arrival to the upcoming portion.

Optionally, the data comprises data indicative of at least one of missing lane markings at the upcoming portion of the road, lane markings being difficult to detect at the upcoming portion of the road, lane markings merging or splitting up at the upcoming portion of the road, and lane markings having a complex geometry at the upcoming portion of the road. The provision of having data indicative of missing lane markings, lane markings being difficult to detect, merging or splitting or having a complex geometry provides an improved ability to predict an upcoming handover requirement and thus provides an improved ability to provide the alert signal in a reliable manner.

Optionally, the data at least partially is based on data recorded by one or more vehicles having previously travelled the upcoming portion of the road. As a result, the automated autonomous driving aid system of the vehicle hosting the arrangement can benefit from the experiences of other vehicles, having previously travelled the same road portion. Thereby, the alert signal can be provided in an even more reliable manner.

Optionally, the data comprises at least one of data indicative of steering control driving aid systems of the one or more vehicles having been switched from an activated state to a deactivated state at the upcoming portion of the road, date and time when the data was recorded, and driving direction of the one or more vehicles when the data was recorded.

As a result, by logging the positions of where drivers engages and disengages the automated autonomous driving functions, it will be possible for the arrangement to quickly determine at which upcoming portions of the road transitions to and from automated autonomous driving can be expected to be necessary. Further, having date and time logged with the logging positions enables the automated autonomous driving aid system to use historical travel patterns for further improving determination. Thereby, the alert signal can be provided in an even more reliable manner.

Optionally, the arrangement further is configured to provide the alert signal at a first predetermined distance to, or at a first predetermined time prior to an estimated time of arrival to, the upcoming portion of the road. As a result, an alert signal can be provided sufficiently early to enable a driver of the vehicle to prepare for a handover of control of steering of the vehicle.

Optionally, the alert signal comprises at least one of an estimated time of arrival to the upcoming portion of the road, and a distance to the upcoming portion of the road. As a result, a driver of the vehicle hosting is provided information indicating the distance to and/or the estimated time of arrival to an upcoming portion of the road where the data indicates an incapability of performing automated steering of the vehicle. Thus, the arrangement provides a more useful alert with respect to enabling a determination of when a transition from automated autonomous driving can be expected to be necessary. As a result, the driver will be able to plan the takeover of control of steering.

Optionally, the arrangement further comprises a vehicle velocity control driving aid system configured to control velocity of the vehicle hosting the arrangement, wherein the vehicle velocity control driving aid system is configured to reduce the velocity of the vehicle in case at least one of the distance from the vehicle hosting the arrangement to the upcoming portion of the road is shorter than a second predetermined distance and an estimated time of arrival to the upcoming portion of the road is lower than a second predetermined time prior to an estimated time of arrival to the upcoming portion of the road.

As a result, the arrangement can adapt the velocity of the vehicle to the upcoming portion of the road, and thus providing a suitable travelling velocity for an expected handover event. Further, if no takeover of control of steering is performed prior to arrival to the upcoming portion, the vehicle will have a lower travelling velocity upon arrival to the upcoming portion. As a result, safety of driving is further improved.

Optionally, the arrangement is further configured to provide a notification signal in the driver environment, via the alert signal arrangement, in case the steering control driving aid system is in the deactivated state and in case at least one of the distance from the vehicle hosting the arrangement to the upcoming portion of the road exceeds a third predetermined distance and an estimated time of arrival to the upcoming portion of the road exceeds a third predetermined time prior to an estimated time of arrival to the upcoming portion of the road.

As a result, the arrangement will provide a notification signal in advance when approaching an upcoming portion of the road where it is suitable to activate the steering control driving aid system. Thereby, a driver of the vehicle hosting the arrangement will thus be informed and may choose to activate the steering control driving aid system.

Optionally, the arrangement is configured to record data indicative of an incapability of performing automated steering of the vehicle and where the communication arrangement is configured to upload the recorded data to the database together with a position of the vehicle and a heading direction of the vehicle in which the recording were performed. As a result, the database will contain even more data for vehicles travelling the same road at a later time, further improving the ability to determine where a handover to/from an automated autonomous driving aid system is likely to be required.

Further embodiments of the disclosure relate to a database that comprises data indicative of an incapability of performing automated steering of the vehicle, as above. The provision of a database that comprises data indicative of an incapability of performing automated steering of the vehicle, as above, further improved ability to determine where a handover to/from an automated autonomous driving aid system is likely to be required is provided.

Further embodiments of the disclosure relate to a vehicle comprising an arrangement configured to facilitate handover to and from an automated autonomous driving aid system of a vehicle hosting the arrangement, as above.

According to some embodiments of the present disclosure, the object is achieved by a method for facilitating handover to and from an automated autonomous driving aid system of a vehicle hosting an arrangement comprising a lane marking detecting unit configured to detect lane markings in an environment surrounding the vehicle, a steering control driving aid system having an activated state in which the steering control driving aid system is configured to perform an automated steering of the vehicle by controlling steering of the vehicle in response to the detected lane markings, and an deactivated state in which no automated steering is performed, a positioning system configured to determine a current position of the vehicle and a current heading direction of the vehicle, an alert signal arrangement configured to selectively provide an alert signal in a driver environment of the vehicle, and a communication arrangement arranged to communicate with a database comprising data indicative of an incapability of performing automated steering of the vehicle at a portion of a road preceding the vehicle, the method comprising:

determining a current position of the vehicle and a current heading direction of the vehicle, using the positioning system uploading to the database, at least one of the current position together with the current heading direction of the vehicle, and a planned route of the vehicle, and in response thereto, receiving the data from the database, and providing an alert signal, via the alert signal arrangement, in case the data indicates an incapability of performing an automated steering of the vehicle at an upcoming portion of the road.

Since the database comprises data indicative of an incapability of performing automated steering of the vehicle at a portion of a road preceding the vehicle and where the method comprises the step of providing an alert signal, via the alert signal arrangement, in case the data indicates an incapability of performing an automated steering of the vehicle at an upcoming portion of the road, the alert signal will be provided in case the data indicates an incapability of performing an automated steering of the vehicle at an upcoming portion of the road. As a result, a more trustful and predictable driving experience is provided whereby the predictability of transition requirements, to and from the automated autonomous driving aid control system is increased.

Further, since the method comprises the step of providing the alert signal, via the alert signal arrangement, in case the data indicates an incapability of performing an automated steering of the vehicle at an upcoming portion of the road, a driver of the vehicle hosting the arrangement is alerted of the incapability of performing an automated steering of the vehicle at an upcoming portion of the road. As a result, the driver may take over control of the vehicle prior to arrival to the upcoming portion. Thus, the driver will have more time available for such a takeover of control of steering of the vehicle. Accordingly, handover from the automated autonomous driving aid system is facilitated. Further, safety of driving is improved.

Optionally, the arrangement further comprises a vehicle velocity control driving aid system configured to control velocity of the vehicle hosting the arrangement, wherein the method further comprises:

reducing the velocity of the vehicle, using the vehicle velocity control driving aid system, in case at least one of the distance from the vehicle hosting the arrangement to the upcoming portion of the road is shorter than a second predetermined distance and an estimated time of arrival to the upcoming portion of the road is lower than a second predetermined time prior to an estimated time of arrival to the upcoming portion of the road.

As a result, the arrangement can adapt the velocity of the vehicle to the upcoming portion of the road, providing a suitable travelling velocity for an expected handover event. Further, if no takeover of control of steering is performed prior to arrival to the upcoming portion, the vehicle will have a lower travelling velocity upon arrival to the upcoming portion. As a result, the safety of driving is further improved.

Optionally, the method further comprises:

providing a notification signal in the driver environment, using the alert signal arrangement, in case the steering control driving aid system is in the deactivated state and in case at least one of the distance from the vehicle hosting the arrangement to the upcoming portion of the road exceeds a third predetermined distance and an estimated time of arrival to the upcoming portion of the road exceeds a third predetermined time prior to an estimated time of arrival to the upcoming portion of the road.

As a result, the method will provide a notification signal in advance when approaching an upcoming portion of the road where it is suitable to activate the steering control driving aid system. Thereby, a driver of the vehicle hosting the arrangement will thus be informed and may choose to activate the steering control driving aid system.

Optionally, the method further comprises:

recording data indicative of an incapability of performing automated steering of the vehicle, using the arrangement, and uploading the recorded data to the database together with a position of the vehicle and a heading direction of the vehicle in which the recording were performed, using the communication arrangement.

As a result, the database will contain even more data for following vehicles, further improving the ability to determine where a handover to/from an automated autonomous driving aid system is likely to be required.

Further features of, and advantages with, the present disclosure will become apparent when studying the appended claims and the following detailed description. Those skilled in the art will realize that the different features described may be combined to create embodiments other than those described in the following, without departing from the scope of the present disclosure, as defined by the appended claims.

BRIEF DESCRIPTION OF THE DRAWINGS

The disclosure, including its particular features, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which example embodiments are shown. Disclosed features of example embodiments may be combined as readily understood by one of ordinary skill in the art. Like numbers refer to like elements throughout.

Well-known functions or constructions will not necessarily be described in detail for brevity and/or clarity.

Figure 1:
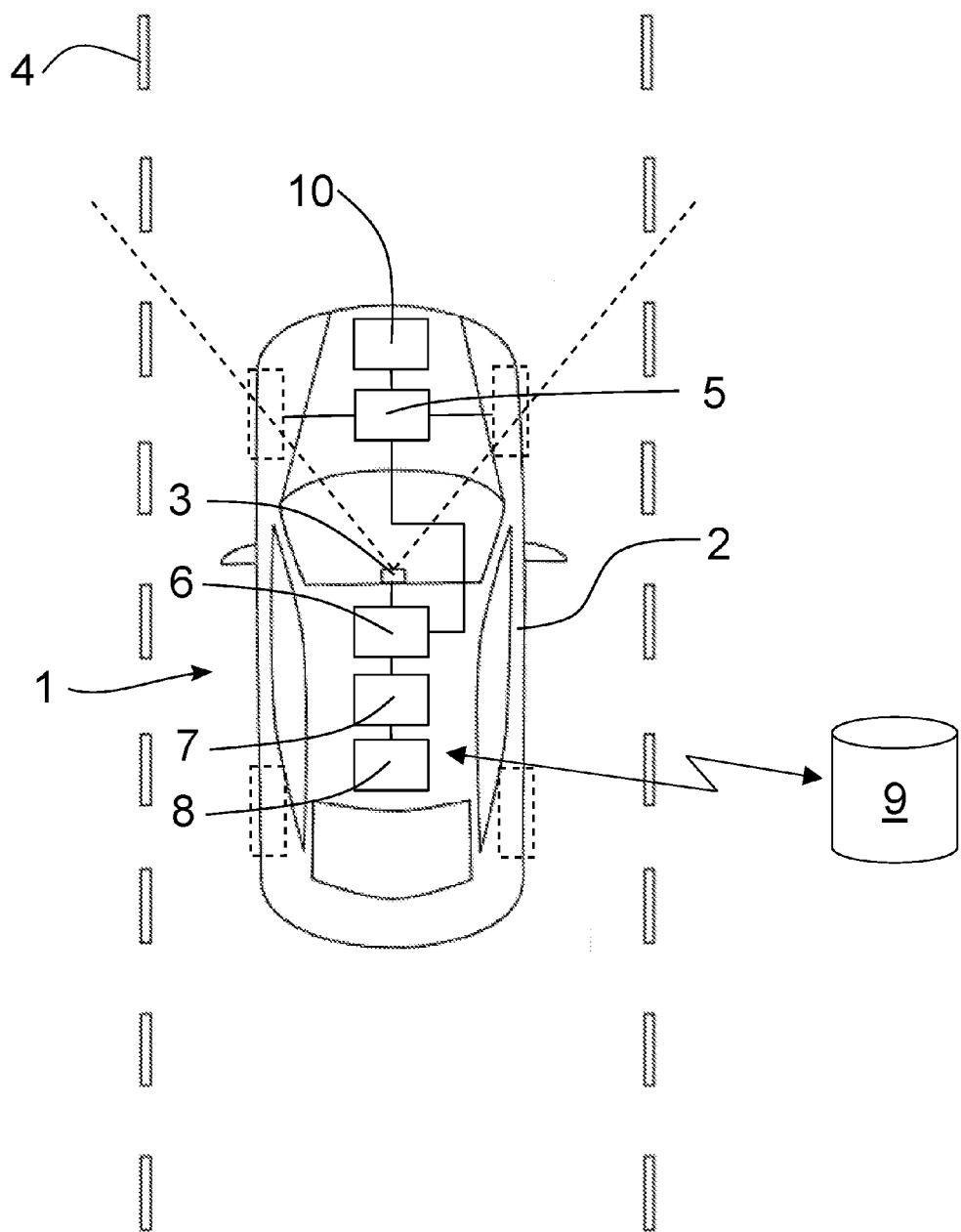
FIG. 1 schematically illustrates an arrangement configured to facilitate handover to and from an automated autonomous driving aid system according to embodiments herein.

In accordance herewith, and as illustrated in FIG. 1, is provided an arrangement 1 configured to facilitate handover to and from an automated autonomous driving aid system of a vehicle 2 hosting the arrangement 1. The arrangement 1 comprises a lane marking detecting unit 3 configured to detect lane markings 4 in an environment surrounding the vehicle 2, such as a forward facing camera, radar, racam or similar. The lane marking detecting unit 3 may be further configured to detect landmarks and objects such as potholes, curvatures, traffic signs etc.

The arrangement 1 further comprises a steering control driving aid system 5 having an activated state in which the steering control driving aid system 5 is configured to perform an automated steering of the vehicle 2 by controlling steering of the vehicle 2 in response to the detected lane markings 4, and a deactivated state in which no automated steering is performed. In embodiments where the lane marking detecting unit 3 is further configured to detect landmarks and objects such as potholes, curvatures, traffic signs etc., the steering control driving aid system 5 may be further configured to perform an automated steering of the vehicle 2 by controlling steering of the vehicle 2 in response to such landmarks and objects as well.

The arrangement 1 further comprises, a positioning system 6 configured to determine a current position of the vehicle 2 and a current heading direction of the vehicle. The positioning system 6 may e.g. comprise a GPS-positioning system 6, possibly with navigation capabilities, or similar satellite based positioning system 6, or alternatively a cellular network based positioning system 6, or a combination of such systems.

The arrangement 1 further comprises an alert signal arrangement 7 configured to selectively provide an alert signal in a driver environment of the vehicle 2, e.g. in a passenger compartment of the vehicle 2 such that it will be perceivable by a driver positioned in a driver seat of the vehicle 2. The alert signal arrangement 7 may be arranged to provide the alert signal as an acoustic alert, a visual alert, a haptic alert or any combination thereof. The alert signal arrangement 7 may comprise a speaker, a display, a haptic alerting unit, or any combination thereof.

The arrangement 1 further comprises a communication arrangement 8 arranged to communicate with a database 9, as illustrated by the zig-zag arrow illustrated in FIG. 1. The communication arrangement 8 may comprise a transceiver arranged to communicate with the database 9 wirelessly, e.g. over a cellular communication network or similar.

The database 9 comprises data indicative of an incapability of performing automated steering of the vehicle 2 at a portion of a road preceding the vehicle 2. The database 9 is suitably arranged in a cloud or a remote server or similar. According to some embodiments, the database is arranged in the vehicle 2 hosting the arrangement 1. In such embodiments, the communication arrangement 8 may comprise an electric cable or similar and data indicative of an incapability of performing automated steering of the vehicle 2 at a portion of a road preceding the vehicle 2 may be downloaded from an external source to the database of the arrangement 1. According to further embodiments, the database is arranged in the vehicle 2 and where the communication arrangement 8 is arranged to intermittently download data indicative of an incapability of performing automated steering of the vehicle 2 at a portion of a road from an external database 9 to the database arranged in the vehicle 2 hosting the arrangement 1.

The communication arrangement 8 is configured upload, to the database 9, at least one of the current position together with the current heading direction of the vehicle 2, and a planned route of the vehicle 2, and in response thereto, receive data from the database 9.

The arrangement 1 is configured to provide an alert signal, via the alert signal arrangement 7, in case the data indicates an incapability of performing an automated steering of the vehicle 2 at an upcoming portion of the road.

Thus, since the database 9 comprises data indicative of an incapability of performing automated steering of the vehicle 2 at a portion of a road preceding the vehicle 2 and the arrangement 1 is configured to provide an alert signal, via the alert signal arrangement 7, in case the data indicates an incapability of performing an automated steering of the vehicle 2 at an upcoming portion of the road, predictability of transition requirements, to and from the automated autonomous driving aid control system is increased.

According to some embodiments, the data comprises data indicative of at least one of missing lane markings 4 at the upcoming portion of the road, lane markings 4 being difficult to detect at the upcoming portion of the road, lane markings 4 merging or splitting up at the upcoming portion of the road, and lane markings 4 having a complex geometry at the upcoming portion of the road. Lane markings 4 may be missing due to being worn and not having been repainted recently, or not yet been provided due to e.g. resurfacing of the road, or simply because they have never been provided in the first place. They may be difficult to detect due to e.g. soiling, being covered by leaves or snow and ice, water etc. Lane markings 4 may be difficult to handle by the arrangement 1 due to the lane markings 4 merging or splitting up, e.g. lane markings 4 at highway exits or markings 4 in intersections and roundabouts. Furthermore, the arrangement 1 may have difficulties in interpreting lane markings 4 having complex geometries, such as at road constructions where several lane markings may be present.

According to some embodiments, the data at least partially is based on data recorded by one or more vehicles having previously travelled the upcoming portion of the road. Hereby the automated autonomous driving aid system of the vehicle 2 hosting the arrangement 1 can benefit from the experiences of other vehicles 2, having previously travelled the same road portion.

According to some embodiments, the arrangement 1 further comprises that the data comprises at least one of data indicative of steering control driving aid systems 5 of the one or more vehicles 2 having previously travelled the upcoming portion of the road having been switched from an activated state to an deactivated state at the upcoming portion of the road, date and time when the data was recorded, and driving direction of the one or more vehicles 2 when the data was recorded. Hereby, it will be possible for the arrangement 1 to quickly determine at which upcoming portions of the road transitions to and from automated autonomous driving can be expected to be necessary. Further, having date and time logged with the logging positions enables the automated autonomous driving aid system to use historical travel patterns for further improving the determination.

In further embodiments the arrangement 1 further is configured to provide the alert signal at a first predetermined distance to, or at a first predetermined time prior to an estimated time of arrival to, the upcoming portion of the road. Hereby, an alert signal can be provided sufficiently early to enable a driver of the vehicle 2 to prepare for a handover event.

In yet further embodiments, the alert signal comprises at least one of an estimated time of arrival to the upcoming portion of the road, and a distance to the upcoming portion of the road. The estimated time of arrival to the upcoming portion of the road, and/or the distance to the upcoming portion of the road may be displayed to the driver, using the alert signal arrangement 7. The displaying of the estimated time of arrival to the upcoming portion of the road, and/or the distance to the upcoming portion of the road may be continuously updated during host vehicle travel. In such embodiments, the displaying of the estimated time of arrival to the upcoming portion of the road, and/or the distance to the upcoming portion of the road may be provided as a countdown timer displaying the estimated time of arrival, and/or the distance to the upcoming portion of the road. Hereby, it will be possible to provide a more useful alert with respect to enabling a determination of when a transition to or from automated autonomous driving can be expected to be necessary.

The first predetermined distance to the upcoming portion of the road may for example comprise a distance between 50 meters to 2 kilometers. The first predetermined distance to the upcoming portion of the road may for example further comprise a distance between 100 meters to 800 meters. The first predetermined time prior to an estimated time of arrival to the upcoming portion of the road may for example comprise a time between 5 seconds and 20 minutes. The first predetermined time prior to an estimated time of arrival to the upcoming portion of the road may for example further comprise a time between 5 seconds and 10 seconds.

Thus, by providing the alert signal at such a first predetermined distance to, or at such a first predetermined time prior to an estimated time of arrival to, the upcoming portion of the road, the alert signal is provided sufficiently early to enable a driver of the vehicle 2 to prepare for a handover event.

According to still further embodiments the arrangement 1 further comprises a vehicle 2 velocity control driving aid system 10 configured to control velocity of the vehicle 2 hosting the arrangement 1. Such a vehicle 2 velocity control driving aid system 10 may be arranged to control vehicle 2 velocity through handling and/or control of the throttle and/or the brakes of the vehicle 2.

The vehicle 2 velocity control driving aid system 10 is configured to reduce the velocity of the vehicle 2 in case at least one of the distance from the vehicle 2 hosting the arrangement 1 to the upcoming portion of the road is shorter than a second predetermined distance and an estimated time of arrival to the upcoming portion of the road is lower than a second predetermined time prior to an estimated time of arrival of the vehicle 2 to the upcoming portion of the road. Thus providing a suitable travelling velocity for an expected handover event.

The second predetermined distance to the upcoming portion of the road may for example comprise a distance between 20 meters to 200 meters. The second predetermined distance to the upcoming portion of the road may for example further comprise a distance between 50 meters to 100 meters. The second predetermined time prior to an estimated time of arrival to the upcoming portion of the road may for example comprise a time between 4 seconds and 30 seconds. The second predetermined time prior to an estimated time of arrival to the upcoming portion of the road may for example further comprise a time between 7 seconds and 15 seconds.

Thus, by reducing the velocity of the vehicle 2 in case at least one of the distance from the vehicle 2 hosting the arrangement 1 to the upcoming portion of the road is shorter than such a second predetermined distance and an estimated time of arrival to the upcoming portion of the road is lower than such a second predetermined time prior to an estimated time of arrival of the vehicle 2 to the upcoming portion of the road, the arrangement 1 has sufficient time to adapt the velocity of the vehicle 1 to the upcoming portion of the road, thus providing a suitable travelling velocity for an expected handover event. Further, if no takeover of control of steering is performed prior to arrival to the upcoming portion, the vehicle 1 will have a lower travelling velocity upon arrival to the upcoming portion. As a result of these features, safety of driving is further improved.

According to some embodiments, the arrangement 1 is further configured to provide a notification signal in the driver environment, via the alert signal arrangement 7, in case the steering control driving aid system 5 is in the deactivated state and in case at least one of the distance from the vehicle 2 hosting the arrangement 1 to the upcoming portion of the road exceeds a third predetermined distance and an estimated time of arrival to the upcoming portion of the road exceeds a third predetermined time prior to an estimated time of arrival to the upcoming portion of the road. Hereby, the arrangement 1 will provide a notification signal in advance when approaching an upcoming portion of the road where it is suitable to activate the steering control driving aid system 5.

The third predetermined distance to the upcoming portion of the road may for example comprise a distance between 2 kilometers to 20 kilometers. The third predetermined distance to the upcoming portion of the road may for example further comprise a distance between 4 kilometers to 10 kilometers. The third predetermined time prior to an estimated time of arrival to the upcoming portion of the road may comprise a time between 2 minutes and 20 minutes. The third predetermined time prior to an estimated time of arrival to the upcoming portion of the road may for example further comprise a time between 4 minutes and 10 minutes.

Thus, by providing the notification signal in the driver environment, via the alert signal arrangement 7, in case the steering control driving aid system 5 is in the deactivated state and in case at least one of the distance from the vehicle 2 hosting the arrangement 1 to the upcoming portion of the road exceeds such a third predetermined distance and an estimated time of arrival to the upcoming portion of the road exceeds such a third predetermined time prior to an estimated time of arrival to the upcoming portion of the road, the arrangement 1 will provide a notification signal when the distance from the vehicle 2 hosting the arrangement 1 to the upcoming portion of the road has a sufficient length and/or when a time to the estimated time of arrival to the upcoming portion is sufficient to motivate an activation of the steering control driving aid system 5.

According to some embodiments, the notification signal in the driver environment, provided via the alert signal arrangement 7, comprises at least one of the distance from the vehicle 2 hosting the arrangement 1 to the upcoming portion of the road and the estimated time of arrival to the upcoming portion of the road. Thereby, the driver of the vehicle 2 hosting the arrangement is informed about the distance from the vehicle 2 hosting the arrangement 1 to the upcoming portion of the road and/or the estimated time of arrival to the upcoming portion of the road and may on the basis thereof choose to activate the steering control driving aid system 5.

Since the arrangement 1, according to some embodiments, is configured to provide the notification signal in case the steering control driving aid system 5 is in the deactivated state and in case at least one of the distance from the vehicle 2 hosting the arrangement 1 to the upcoming portion of the road exceeds a third predetermined distance and an estimated time of arrival to the upcoming portion of the road exceeds a third predetermined time prior to an estimated time of arrival to the upcoming portion of the road, in these embodiments, the notification signal is provided if the distance from the vehicle 2 hosting the arrangement 1 to the upcoming portion of the road is an infinite distance and/or if the estimated time of arrival to the upcoming portion of the road is an infinite amount of time.

That is, in such embodiments, the arrangement 1 is configured to provide the notification signal in case the data indicates no incapability of performing automated steering of the vehicle hosting the arrangement 1 at a portion of a road preceding the vehicle 1, leading to such an infinite distance and such an infinite amount of time.

In still some embodiments, the arrangement 1 is configured to record data indicative of an incapability of performing automated steering of the vehicle 2. The communication arrangement 8 is here configured to upload the recorded data to the database 9 together with a position of the vehicle 2 and a heading direction of the vehicle 2 in which the recording was performed. Hereby, the database 9 will be provided with even more data for following vehicles, further improving the ability to determine where a handover to/from an automated autonomous driving aid system is likely to be required.

It should be noted that the automated autonomous driving aid system, lane marking detecting unit 3, steering control driving aid system 5, positioning system 6, alert signal arrangement 7, communication arrangement 8, database 9, vehicle velocity control driving aid system 10, and any other system, arrangement, unit or the like described herein may comprise or further comprise a combination of analog and digital circuits and/or one or more processors and memory configured with software and/or firmware, e.g., stored in the memory, that when executed by the one or more processors perform the functions and/or operations described herein. One or more of such processors, as well as other digital hardware may be included in a single ASIC (Application-Specific Integrated Circuitry), or several processors and various digital hardware may be distributed among several separate components, whether individually packaged or assembled into a SoC (System-on-a-Chip).

In accordance with the present disclosure is also envisaged a database 9 that comprises data indicative of an incapability of performing automated steering of the vehicle 2. Such a database 9 will further provide an improved ability to determine where a handover to/from an automated autonomous driving aid system is likely to be required. In that regard, the database 9 may comprise a storage medium or device and one or more processors, which may comprise a local and/or remote server, having and/or for use with software and/or firmware that when executed by the one or more processors perform the functions and/or operations described herein. Such software and/or firmware may comprise computer executable instructions for use with an arrangement for facilitating handover to and from an automated autonomous driving aid system of a vehicle. The computer executable instructions may comprise instructions for implementing a database and/or a database management system for defining and/or managing a database having data indicative of an incapability of performing automated steering of the vehicle. The computer executable instructions for implementing a database and/or a database management system may comprise instructions for creating, structuring, defining, indexing, acquiring, receiving, storing, adding, updating, deleting, searching, querying, fetching, retrieving, sorting, sending, returning, and/or otherwise defining, manipulating, managing and/or administering the database and/or data associated therewith.

The present disclosure also relates to a vehicle 2 comprising an arrangement 1 configured to facilitate handover to and from an automated autonomous driving aid system of a vehicle 2 hosting the arrangement 1, as above.

Figure 2:
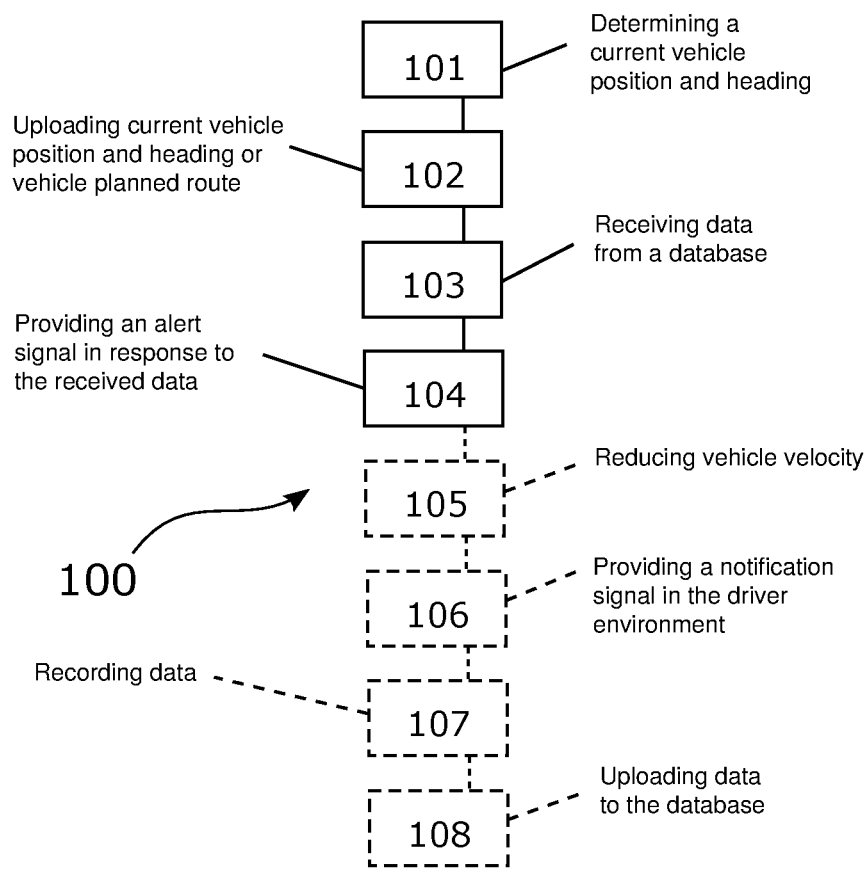
FIG. 2 illustrates a method for facilitating handover to and from an automated autonomous driving aid system according to embodiments herein.

Still further, in accordance with the present disclosure is also envisaged a method 100, as illustrated in FIG. 2, for facilitating handover to and from an automated autonomous driving aid system of a vehicle 2 hosting an arrangement 1 comprising a lane marking detecting unit 3 configured to detect lane markings 4 in an environment surrounding the vehicle 2, a steering control driving aid system 5 having an activated state in which the steering control driving aid system 5 is configured to perform an automated steering of the vehicle 2 by controlling steering of the vehicle 2 in response to the detected lane markings 4, and an deactivated state in which no automated steering is performed, a positioning system 6 configured to determine a current position of the vehicle 2 and a current heading direction of the vehicle 2, an alert signal arrangement 7 configured to selectively provide an alert signal in a driver environment of the vehicle 2, and a communication arrangement 8 arranged to communicate with a database 9 comprising data indicative of an incapability of performing automated steering of the vehicle 2 at a portion of a road preceding the vehicle 2, the method 100 comprising:

determining 101 a current position of the vehicle 2 and a current heading direction of the vehicle 2, using the positioning system 6, uploading 102 to the database 9, at least one of the current position together with the current heading direction of the vehicle 2, and a planned route of the vehicle 2, and in response thereto, receiving 103 the data from the database 9, and providing 104 an alert signal, via the alert signal arrangement 7, in case the data indicates an incapability of performing an automated steering of the vehicle 2 at an upcoming portion of the road.

Having a database 9 that comprises data indicative of an incapability of performing automated steering of the vehicle 2 at a portion of a road preceding the vehicle 2 enables an advance awareness of transition requirements. An alert signal will thus be provided, via the alert signal arrangement 7, in case the data indicates an incapability of performing an automated steering of the vehicle 2 at an upcoming portion of the road.

According to some embodiments, the providing 104 of the alert signal is performed at a first predetermined distance to, or at a first predetermined time prior to an estimated time of arrival to, said upcoming portion of said road.

According to some embodiments, the providing 104 of the alert signal comprises at least one of an estimated time of arrival to the upcoming portion of the road, and a distance to the upcoming portion of the road.

According to some embodiments, in which the arrangement 1 further comprises a vehicle velocity control driving aid system 10 configured to control velocity of the vehicle 2 hosting the arrangement 1, the method 100 further comprises:

reducing 105 the velocity of the vehicle 2, using the vehicle velocity control driving aid system 10, in case at least one of the distance from the vehicle 2 hosting the arrangement 1 to the upcoming portion of the road is shorter than a second predetermined distance and an estimated time of arrival to the upcoming portion of the road is lower than a second predetermined time prior to an estimated time of arrival to the upcoming portion of the road.

Hereby, the velocity of the vehicle 2 can be adapted to the upcoming portion of the road, such that a suitable travelling velocity for an expected handover event is provided.

According to yet some further embodiments the method 100 further comprises:

providing 106 a notification signal in the driver environment, using the alert signal arrangement 7, in case the steering control driving aid system 5 is in the deactivated state and in case at least one of the distance from the vehicle 2 hosting the arrangement 1 to the upcoming portion of the road exceeds a third predetermined distance and an estimated time of arrival to the upcoming portion of the road exceeds a third predetermined time prior to an estimated time of arrival to the upcoming portion of the road.

Hereby, a notification signal will be provided in advance when approaching an upcoming portion of the road where it is suitable to activate the steering control driving aid system 5. Thus, in accordance with the present disclosure, is further facilitated efficient use of automated autonomous driving aid systems.

In accordance with still further embodiments the method 100 further comprises:

recording 107 data indicative of an incapability of performing automated steering of the vehicle 2, using the arrangement 1, and uploading 108 the recorded data to the database 9 together with a position of the vehicle 2 and a heading direction of the vehicle 2 in which the recording were performed, using the communication arrangement 8.

As a result, the database 9 will contain even more data for vehicles travelling the same road at a later time or vehicles travelling the same road portion at a later time, further improving the ability to determine where a handover to/from an automated autonomous driving aid system is likely to be required and enabling appropriate alerting thereof.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A handover facilitating arrangement configured to facilitate handover to and from an automated autonomous driving aid system of a vehicle hosting the handover facilitating arrangement, the handover facilitating arrangement comprising:

a lane marking detecting unit configured to detect lane markings in an environment surrounding the vehicle;

a positioning system configured to determine a current position of the vehicle and a current heading direction of the vehicle;

an alert signal device configured to selectively provide an alert signal in a driver environment of the vehicle;

a communication system configured to communicate wirelessly with a database comprising lane mark data indicative of an incapability of performing automated steering of the vehicle at a portion of a road preceding the vehicle wherein the communication system is configured to upload, to the database, at least one of the current position together with the current heading direction of the vehicle, and a planned route of the vehicle, and in response thereto, receive the lane mark data from the database, and wherein the communication system is configured to provide an alert signal, via the alert signal device in case the lane mark data indicates the incapability of performing an automated steering of the vehicle at an upcoming portion of the road; and a steering control driving aid system having an activated state in which the steering control driving aid system is configured to perform an automated steering of the vehicle by controlling steering of the vehicle in response to the detected lane markings, and a deactivated state in which no automated steering is performed after handover of control of steering of the vehicle to a driver based on the alert signal.

2. The handover facilitating arrangement according to claim 1 wherein the lane mark data comprises data indicative of at least one of missing lane markings at the upcoming portion of the road, lane markings being difficult to detect at the upcoming portion of the road, lane markings merging or splitting up at the upcoming portion of the road, and lane markings having a complex geometry at the upcoming portion of the road.

3. The handover facilitating arrangement according to claim 1 wherein the lane mark data at least partially is based on data recorded by one or more vehicles having previously travelled the upcoming portion of the road.

4. The handover facilitating arrangement according to claim 3 wherein the lane mark data comprises at least one of data indicative of steering control driving aid systems of the one or more vehicles having been switched from an activated state to an deactivated state at the upcoming portion of the road, date and time when the data was recorded, and driving direction of the one or more vehicles when the data was recorded.

5. The handover facilitating arrangement according to claim 1 wherein the handover facilitating arrangement is configured to provide the alert signal at a first predetermined distance to, or at a first predetermined time prior to an estimated time of arrival to, the upcoming portion of the road.

6. The handover facilitating arrangement according to claim 1 wherein the alert signal comprises at least one of an estimated time of arrival to the upcoming portion of the road, and a distance to the upcoming portion of the road.

7. The handover facilitating arrangement according to claim 1 further comprising a vehicle velocity control driving aid system configured to control velocity of the vehicle hosting the handover facilitating arrangement, wherein the vehicle velocity control driving aid system is configured to reduce the velocity of the vehicle in case at least one of a distance from the vehicle hosting the handover facilitating arrangement to the upcoming portion of the road is shorter than a second predetermined distance and an estimated time of arrival to the upcoming portion of the road is lower than a second predetermined time prior to an estimated time of arrival to the upcoming portion of the road.

8. The handover facilitating arrangement according to claim 1 wherein the handover facilitating arrangement is further configured to provide a notification signal in a driver environment, via the alert signal arrangement, in case the steering control driving aid system is in the deactivated state and in case at least one of a distance from the vehicle hosting the handover facilitating arrangement to the upcoming portion of the road exceeds a third predetermined distance and an estimated time of arrival to the upcoming portion of the road exceeds a third predetermined time prior to an estimated time of arrival to the upcoming portion of the road.

9. The handover facilitating arrangement according to claim 1 wherein the handover facilitating arrangement is configured to record the lane mark data indicative of the incapability of performing automated steering of the vehicle and wherein the communication system is configured to upload the recorded lane mark data to the database together with a position of the vehicle and a heading direction of the vehicle in which the recording were performed.

10. A vehicle comprising the arrangement according to claim 1.

11. A method for facilitating handover to and from an automated autonomous driving aid system of a vehicle hosting a handover facilitating arrangement wherein the handover facilitating arrangement comprises a lane marking detecting unit configured to detect lane markings in an environment surrounding the vehicle, and a steering control driving aid system having an activated state in which the steering control driving aid system is configured to perform an automated steering of the vehicle by controlling steering of the vehicle in response to the detected lane markings, and a deactivated state in which no automated steering is performed, the method comprising:

determining a current position of the vehicle and a current heading direction of the vehicle, using a positioning system of the handover facilitating arrangement;

uploading to a database, via a communication system of the handover facilitating arrangement, at least one of the current position together with the current heading direction of the vehicle, and a planned route of the vehicle, wherein the database comprises lane mark data indicative of an incapability of performing automated steering of the vehicle at a portion of a road preceding the vehicle;

receiving the lane mark data from the database;

providing an alert signal, via an alert signal device of the handover facilitating arrangement, in case the lane mark data indicates the incapability of performing automated steering of the vehicle at an upcoming portion of the road; and performing a handover of control of steering of the vehicle to a driver based on the alert signal.

12. The method according to claim 11 wherein the handover facilitating arrangement further comprises a vehicle velocity control driving aid system configured to control velocity of the vehicle hosting the handover facilitating arrangement, the method further comprising:

reducing the velocity of the vehicle, using the vehicle velocity control driving aid system, in case at least one of a distance from the vehicle hosting the handover facilitating arrangement to the upcoming portion of the road is shorter than a second predetermined distance and an estimated time of arrival to the upcoming portion of the road is lower than a second predetermined time prior to an estimated time of arrival to the upcoming portion of the road.

13. The method according to claim 11 further comprising:

providing a notification signal in a driver environment, using the alert signal device in case the steering control driving aid system is in the deactivated state and in case at least one of a distance from the vehicle hosting the handover facilitating arrangement to the upcoming portion of the road exceeds a third predetermined distance and an estimated time of arrival to the upcoming portion of the road exceeds a third predetermined time prior to an estimated time of arrival to the upcoming portion of the road.

14. The method according to claim 11 further comprising:

recording the lane mark data indicative of the incapability of performing automated steering of the vehicle, using the handover facilitating arrangement; and uploading the recorded lane mark data to the database together with a position of the vehicle and a heading direction of the vehicle in which the recording were performed, using the communication system.

\* \* \* \* \*

UNITED STATES PATENT AND TRADEMARK OFFICE
CERTIFICATE OF CORRECTION

Page 1 of 1

PATENT NO. : 9,919,716 B2
APPLICATION NO. : 15/172341
DATED : March 20, 2018
INVENTOR(S) : Claus Allan Christensen et al.

It is certified that error appears in the above-identified patent and that said Letters Patent is hereby corrected as shown below:

In the Claims

Column 14, Lines 12-13, Claim 4:
After "activated state to"
Delete "an" and
Insert -- a --.

Signed and Sealed this
Twenty-fourth Day of July, 2018

Andrei Iancu
*Director of the United States Patent and Trademark Office*